United States Patent [19]

Suzuki et al.

[11] 4,370,235

[45] Jan. 25, 1983

[54] METHOD OF TREATING EXCESS SLUDGE

[75] Inventors: Akira Suzuki, Saitama; Yasumi Shioya, Higashi Kurume, both of Japan

[73] Assignee: Shinryo Air Conditioning Co., Ltd., Tokyo, Japan

[21] Appl. No.: 187,148

[22] Filed: Sep. 15, 1980

Related U.S. Application Data

[63] Continuation of Ser. No. 43,757, May 30, 1979, abandoned.

[30] Foreign Application Priority Data

Jul. 4, 1978 [JP] Japan ................................. 53-81301

[51] Int. Cl.$^3$ .............................................. C02F 1/78
[52] U.S. Cl. .................................... 210/620; 210/631
[58] Field of Search ............... 210/609, 620, 625, 631, 210/760

[56] References Cited

U.S. PATENT DOCUMENTS

| | | | |
|---|---|---|---|
| 3,300,401 | 1/1967 | Sontheimer et al. | 210/609 |
| 3,591,491 | 7/1971 | Smith et al. | 210/625 |
| 3,718,582 | 2/1973 | Smith et al. | 210/625 |
| 3,959,125 | 5/1976 | Teletzke | 210/609 X |

*Primary Examiner*—Thomas G. Wyse
*Attorney, Agent, or Firm*—Oblon, Fisher, Spivak, McClelland & Maier

[57] ABSTRACT

A method for treating excess sludge, which comprises the steps of mixing an inlet stream of waste water with activated sludge, aerating the resulting mixture, separating the effluent water from the activated sludge to be recycled to the mixing step, passing the resulting excess sludge to a conversion stage, treating therein the cells of microorganisms composing suspended solids in said excess sludge to convert them to an organic liquid by a physical and/or physico-chemical means, passing the resulting organic liquid to a digesting stage in which activated sludge takes the organic liquid as a nutrient, aerobically digesting therein the organic liquid and discharging an effluent from the digesting stage.

2 Claims, 5 Drawing Figures

METHOD OF TREATING EXCESS SLUDGE

This is a continuation of application Ser. No. 043,757, filed May 30, 1979, now abandoned.

BACKGROUND OF THE INVENTION

The present invention relates to a method of treating excess sludge formed in the course of purifying waste water, sewage water, etc. (hereinafter referred to as "waste water") by an activated sludge treatment.

The activated sludge method is one of several biological oxidizing treatments and is now widely employed as a method of processing waste water. According to the activated sludge method, an inlet stream of waste water is aerated in the presence of activated sludge and then the discharge from the aeration tank is fed to a settling basin to settle solids as sludge. The settled sludge is returned to the aeration tank and the effluent fluid is discharged to a stream or drain. However, according to this type of treatment the accumulation of excess sludge, i.e. additional sludge, in the final settling basin is unavoidable.

Typically, in the prior art, the excess sludge, after concentration thereof by vacuum, has been carried away by truck to be disposed of, or it has been aerobically or anaerobically digested, or after being dewatered and dried by a mechanical means, e.g. with a drying machine, it has been disposed of. However, each of these prior art methods of disposing of the excess sludge has various drawbacks.

Namely, in case the excess sludge is carried away, the volume of the sludge to be carried and disposed of, even after being concentrated with a thickener, is so enormous that the cost of handling is relatively high, since much reduction in volume cannot be expected.

On the other hand, with the method of aerobically or anaerobically digesting and decomposing the sludge with aerobic or anaerobic bacteria, a long residence period, e.g. 20-30 days, is required to reduce the volume by 30-40%. This means that a digesting tank of large volume is needed, resulting in an increase in construction cost. In addition, the digesting is seriously influenced by temperature, so precise control of temperature is required. Furthermore, even in this method, in the final stage of treatment additional means of dewatering, drying and incinerating the sludge must be employed for complete disposal of the sludge.

In the mechanical dewatering method using a centrifugal separator, which is now widely used, the filter cloth is frequently and easily clogged because the activated sludge usually contains a large amount of colloidal constituents. In addition, the water content of the resulting filter cake is usually high. Thus, it is very difficult to treat the sludge successfully by means of this method. Furthermore, since a large amount of an expensive reagent is also required for coagulation, the mechanical method is relatively costly, too, because of the high cost of the chemicals, power and work required for disposing of the filter cake.

The "activated sludge" comprises suspended solids in water containing soluble matter and colloids. The suspended solids are mainly composed of aerobic bacteria and protozoa (hereinafter referred to as "microorganisms") which spontaneously multiply if the supply of nourishment in the form of biochemically-decomposable organic matter, nitrogen and phosphorous is satisfactory.

The inventors have found, after extensive study, keeping in mind the composition of the activated sludge mentioned above, that cells of the microorganisms of which the activated sludge is mainly composed may be ruptured or destroyed by means of ultrasonic vibration, for example, to provide organic nutrients, which in turn may easily be digested by aerobic microorganisms. The inventors also found that the means of converting the microorganisms into organic nutrients include both physical and physico-chemical means. The physical means include ultrasonic vibration, homogenizer, mechanical mixer, etc. and a means of very rapidly expanding the volume of the sludge due to rapid reduction in pressure, and the physico-chemical means include, for example, decomposition by oxidizing with ozone gas.

Thus, the present invention is essentially different from the prior art method in which the digestion with aerobic or anaerobic bacteria is carried out. According to the present invention, the cells of the microorganisms are converted to provide organic nutrients.

Prior Art

Japanese Patent Publication No. 11813/1974 and U.S. Pat. No. 3,622,507 (1970) disclose a method of treating excess sludge in which an alkali is added to excess sludge. The suspended solids therein, which are soluble in an alkaline solution, are dissolved by heating the excess sludge after the alkali is added, and then the resulting alkaline solution is neutralized with an acid to give a decomposition liquid, which is then recycled to a preceding activated sludge treatment system. However, because treatment with an alkali and neutralization with an acid are essential, this type of system is very complicated and, therefore, it is not practical. In addition, in view of the large amounts of chemicals required, it is too costly. Furthermore, because it is necessary to return the resulting decomposition liquid to the preceding activated sludge treatment system, the aeration tank must have a large treating capacity and the large space required and high construction cost add to its impracticality.

BRIEF EXPLANATION OF THE INVENTION

The object of the invention is to provide a method of treating excess sludge, the construction and running costs of which are relatively low, but which is high in treatment efficiency and in which the amount of sludge to be disposed of is minimal.

The present invention resides in a method of treating excess sludge, which comprises the steps of mixing an inlet stream of waste water with an activated sludge, aerating the resulting mixture, separating the effluent water from the activated sludge to be recycled to the mixing step, passing the excess sludge separated from said activated sludge to a conversion stage, treating therein the cells of microorganisms composed of suspended solids in said excess sludge to convert them to an organic liquid by a physical and/or physico-chemical means, passing the resulting organic liquid to a digesting stage in which activated sludge takes the organic liquid as a nutrient, aerobically digesting therein the organic liquid and discharging an effluent from the digesting stage.

The conversion step may be carried out by physically disintegrating the cells of microorganisms with ultrasonic vibration or by physically disintegrating them with a homogenizer or mixer, or by physically disintegrating them with means of very rapidly expanding the volume of the sludge due to rapid reduction in pressure.

The conversion step may also be carried out by oxidizing the microorganisms with ozone gas to rupture the cells thereof.

These physical and physico-chemical means may be employed in combination.

According to the present invention, as mentioned hereinbefore, the cell structure of the microorganisms of which the excess sludge is mainly composed is efficiently fractured in the conversion step to provide organic nutrition in the form of an organic liquid, which is capable of being easily digested in the subsequent digesting stage.

BRIEF DESCRIPTION OF THE ACCOMPANYING DRAWINGS

The invention will be further described in conjunction with the drawings, in which.

DETAILED DESCRIPTION OF THE PREFERRED EMBODIMENTS

Figure 1:
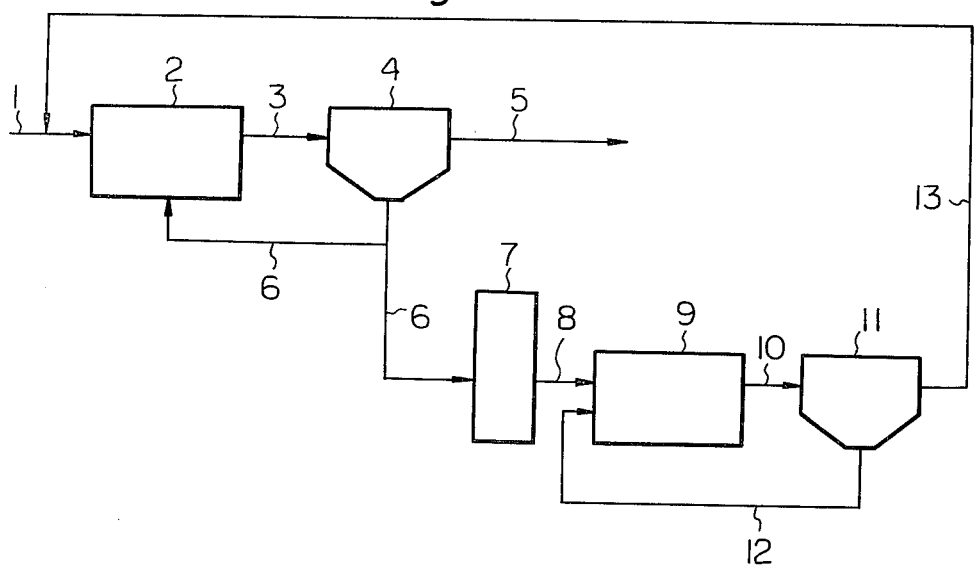
FIG. 1 shows a flow diagram of the present invention for treatment of excess sludge.

Referring to FIG. 1, an inlet stream of waste water from line 1 is aerated in an aeration tank 2 and is passed via line 3 into a second settling basin 4. The effluent liquid in the settling basin is then removed by way of line 5 to a stream, while the settled sludge is returned via line 6 to the aeration tank 2 as return sludge. This is the typical scheme of an activated sludge method.

Now according to the present invention, a portion of the return sludge, i.e. excess sludge, is bypassed via line 6 into a conversion tank 7. In the first stage of the present invention process, the cells of bacteria which comprise a major portion of the suspended solids are disintegrated by a physical and/or physico-chemical means in the conversion tank 7.

The bacterial cells which comprise a major portion of the sludge are converted to an organic liquid in the conversion tank, i.e. in the first stage of the present invention process. The organic liquid is then fed via line 8 to an aerobic digesting tank 9, in which the second stage of the present invention process is carried out. In the aerobic digesting tank 9, in the same manner as in an aeration tank in the activated sludge method, the influent organic liquid is agitated and mixed along with the activated sludge contained in the tank, while the atmosphere within the tank is maintained at aerobic conditions by applying air through diffusers disposed within the tank. The activated sludge put in the tank has previously been adapted to ones which may easily digest the disintegrated excess sludge as nutrition. The excess sludge now converted to an organic liquid is easily digested within the digesting tank 9. Thus, it is possible to effectively process the sludge.

The excess sludge now converted into an organic liquid and digested in the previous steps as described hereinbefore is subsequently passed via line 10 to a settling tank 11 to settle residual solids as sludge. The settled sludge is returned via line 12 to the digesting tank 9 and the effluent is recycled to the system via line 13. A screen may be provided at the inlet of the digesting tank to remove pulps and the like, which are not expected to be decomposable by the process mentioned above. The collected pulps and the like may be incinerated.

According to the present invention process, as will be described in more detail hereinafter, digestion of more than 95% of the solids suspended in the excess sludge can be obtained without need of the addition of chemicals, and therefore construction and operating costs can be significantly reduced, though the process itself is very simple. Taking as an example a plant which treats 6 m$^3$ of sludge per day, in accordance with the present invention process the treatment cost per unit volume of sludge can be reduced to $\frac{1}{3}$-$\frac{1}{4}$ those achieved by the conventional processes, e.g. filter-press method, centrifugal separation method and vacuum dry method.

Figure 2:
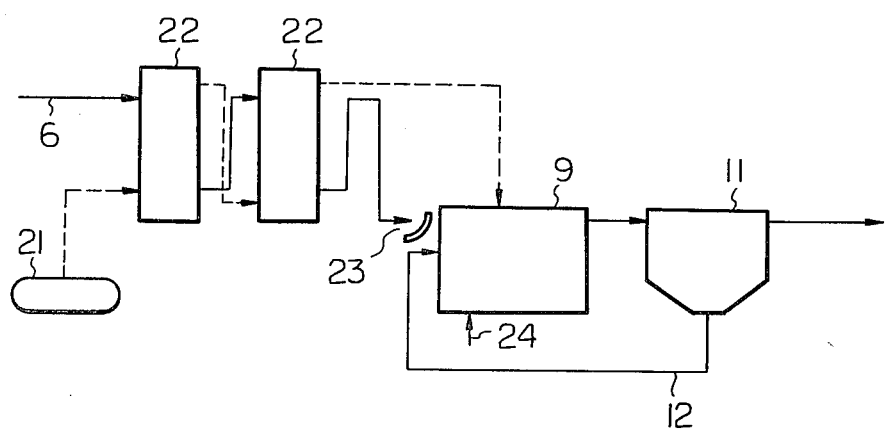
FIG. 2 shows a flow diagram of another embodiment of the present invention, in which ozone contacting towers are employed as a conversion means.

FIG. 2 shows in further detail a flow diagram of another embodiment of the present invention process, which utilizes an ozone contactor as a conversion tank. The same reference figures indicate the same components. The operation is the same as in FIG. 1 except that ozone gas generated in an ozone generator 21 is supplied to ozone contactors 22 to contact excess sludge from line 6 in two stages so that the microorganisms of which the sludge consists are decomposed. The resulting organic liquid is then passed through screen 23 to an aerobic digesting tank 9 and is processed therein in the same manner as described hereinbefore. Air is blown through line 24 into the digesting tank 9 to maintain an aerobic atmosphere within the tank.

According to the present invention, the amount of return sludge to be recycled from settling basin 11 to the digesting tank 9 does not increase, nor does the sludge accumulate, because excess sludge is substantially completely decomposed and digested and no excess sludge is formed.

Figure 3:
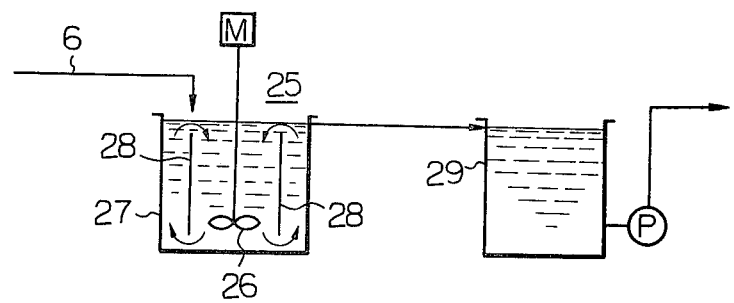
FIG. 3 shows a flow diagram of another embodiment of the present invention, in which a homogenizer is employed as a conversion means.

FIG. 3 shows an embodiment of the present invention in which a homogenizer 25 is used as a conversion means. Excess sludge is fed through line 6 into a conversion tank in which the homogenizer 25 (4000 rpm) provided with a sword-shaped impeller 26 is installed. Microorganisms contained in the sludge are disintegrated by the friction and the shearing action of the impeller. A cylindrical baffle 28 is provided therein in order to prevent the flow of sludge in a tangential direction but to promote the axial flow thereof as indicated by arrows in the drawing, thus improving the contact between the impeller and fluid. After residence for 10 minutes in the conversion tank 27, the charged excess sludge now converted to an organic liquid is fed into a storage tank 29 and then is passed through a screen 23 to the aerobic digesting tank 9.

Figure 4:
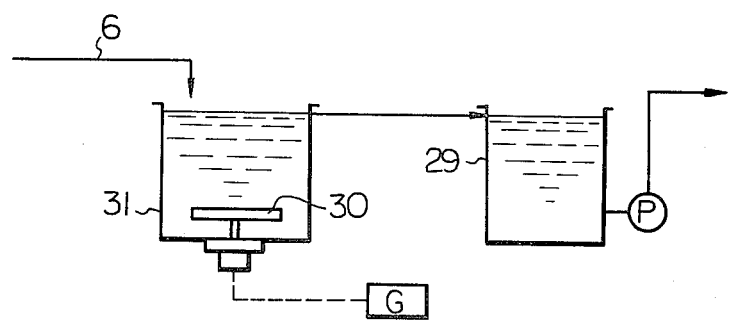
FIG. 4 shows a flow diagram of still another embodiment of the present invention, in which ultrasonic vibration is employed as a conversion means.

FIG. 4 shows an embodiment of the present invention in which ultrasonic vibration is employed as a conversion means. The excess sludge in line 6 is fed into a conversion tank 31 provided with a vibrator 30 which generates ultrasonic vibrations of a frequency of 30–200 KHz. Organic microorganisms are disintegrated by the application of ultrasonic vibration to the sludge. After residence therein for 15 minutes, the sludge is passed into a storage tank 29 and then is fed through a screen 23 into the aerobic digesting tank 9. The reference figure G indicates an vibratory means.

Figure 5:
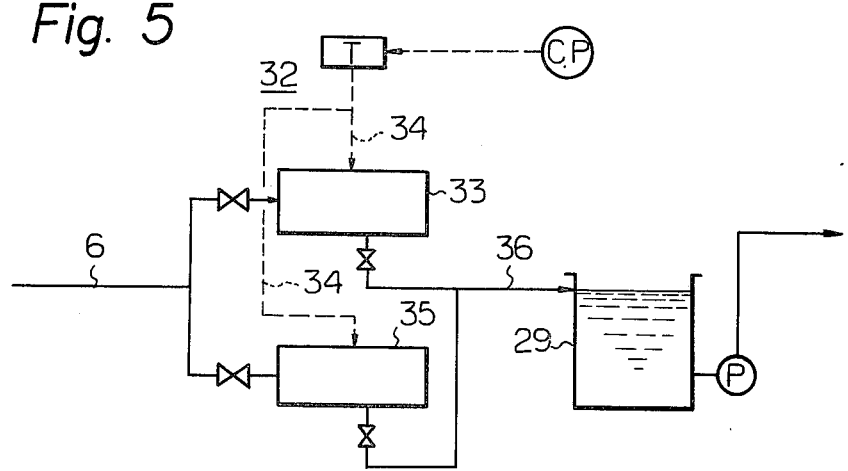
FIG. 5 shows a flow diagram of another embodiment of the present invention, in which a pressure apparatus is employed as a conversion means.

FIG. 5 shows another embodiment of the present invention process in which a pressurizing means 32 is employed as a conversion means. A given amount of excess sludge in line 6 is fed into a pressure tank 33, which is then pressurized to 120–200 Kg/cm² by means of high pressure air supplied through line 34 connected to a high pressure source T. Meanwhile, another given amount of excess sludge in line 6 is fed into another pressure tank 35, which is pressurized in the same manner. The thus pressurized sludge is instantaneously expanded by opening valves in line 36 to rapidly reduce the pressure of the tanks, thus disintegrating the sludge microorganisms. The sludge now disintegrated and converted to an organic liquid is then passed to a storage tank 29. By repeating the increase and decrease of pressure tanks 33 and 35, alternatively, a continuous operation is established successfully. The resulting organic liquid is passed through a screen 23 to the aerobic digesting tank 9.

EXPERIMENT 1

Excess sludge of the composition shown in Table 1 was obtained from an activated sludge method and was treated in accordance with the present invention process.

To 1000 ml of the above mentioned activated sludge ozone gas from an ozone generator was blown in at a rate of 8.8 g/hr for 30 minutes to oxidize and decompose the sludge. The resulting sludge now converted to an organic liquid was then fed into a digesting tank at a rate of 200 cc/day. The operation was continued for 8 days and air was supplied to the digesting tank at a rate of 2000 cc/day. The reduction in volume during operation after running over a day and night was made up by adding distilled water. The test results are summarized in Table 2. After continuous operation for 192 hours 95.8% of the suspended solids (SS) were removed.

As a control, excess sludge without being subjected to oxidation with ozone was passed to an aerobic digesting tank and was processed continuossly in the same manner as in the above for 8 days. The changes in composition of the sludge were recorded. The test results are summarized in Table 3.

TABLE 1

| Water Content | Sludge Composition (% by weight) | | |
|---|---|---|---|
| | pH | Suspended Solids | Others |
| 99.4 | 7.2 | 0.58 | 0.02 |

TABLE 2

| Time (hr) | SS addition (%) | MLSS (g) | pH | Respiration (ppm/min) | Total addition of SS (g) | SS reduction (g) Section | SS reduction (g) Total | SS reduction (g) MLSS (g) · day | Remarks |
|---|---|---|---|---|---|---|---|---|---|
| 0 | — | 2.529 | 7.4 | 0.17 | — | — | — | — | |
| 24.0 | 1.16 | 2.632 | — | 0.20 | 1.16 | 1.057 | 1.057 | 0.418 | |
| 48.5 | 1.16 | 2.710 | — | 0.23 | 2.32 | 1.082 | 2.139 | 0.411 | |
| 72.0 | 1.16 | 2.887 | — | 0.21 | 3.48 | 0.983 | 3.122 | 0.363 | |
| 96.0 | 1.16 | 2.802 | — | 0.21 | 4.64 | 1.245 | 4.367 | 0.431 | |
| 144.0 | 1.16 | 2.730 | — | 0.24 | 5.80 | 1.232 | 5.599 | 0.440 | |
| 168.0 | 1.16 | 2.898 | — | 0.20 | 6.96 | 0.992 | 6.591 | 0.363 | |
| 192.0 | 1.16 | 2.871 | — | 0.23 | 8.12 | 1.187 | 7.778 | 0.410 | |

Note:
Sample charge: 200 cc/day (SS addition 5800 ppm × 200 cc/day = 1.16 g/day)
Volume of the digesting tank: 900 cc
MLSS: mixed liquor suspended solids

TABLE 3

| Time (hr) | MLSS (g) | pH | ORP (mV) | Respiration (ppm/min) | TOC (ppm) | IC (ppm) | SS reduction (g) Section | SS reduction (g) Total | SV (%) | SS reduction (g) MLSS (g) · day | Remarks |
|---|---|---|---|---|---|---|---|---|---|---|---|
| 0 | 2.772 | 7.3 | −18 | 0.37 | 25.8 | 10.5 | — | — | 97.5 | — | |
| 24.0 | 2.703 | 6.8 | 98 | 0.18 | 14.5 | 1.6 | 0.069 | 0.069 | 97.0 | 0.0255 | |
| 48.0 | 2.678 | 6.8 | 2 | 0.35 | 19.7 | 1.8 | 0.025 | 0.094 | 97.0 | 0.0093 | |
| 72.0 | 2.673 | 6.6 | 1 | 0.23 | 11.9 | 1.4 | 0.005 | 0.099 | 97.0 | 0.0019 | |
| 97.0 | 2.569 | 6.6 | 11 | 0.21 | 19.6 | 1.5 | 0.104 | 0.203 | 97.0 | 0.040 | |
| 146.0 | 2.303 | 6.0 | 61 | 0.20 | 11.8 | 2.1 | 0.266 | 0.469 | 96.5 | 0.0578 | |

Note:
The volume of the digesting tank: 900 cc

As is noted from the test results shown in Table 2, the total amount of SS (suspended solids) added for 8 days was 1.16 g/day×7 days=8.12 g (including one holiday). If the removal of the SS had not been expected, 10.649 g of SS would have accumulated on a theoretical basis; an initial amount of 2.529 g of MLSS+8.12 g of SS added=10.649 g. However, in fact, the amount of MLSS was 2.871 g on the eighth day. It means that 7.778 g of SS had been removed. In this case 95.8% of SS added was removed.

It is noted from the control test results shown in Table 3 that the total reduction of SS for 6 days was 0.469 g and that improvement in removal of the SS cannot be expected if only aeration is applied.

The reason why the SS is remarkably removed by digesting the sludge which has been oxidized with ozone is that upon the contact of the sludge with ozone the organic matter composing the sludge is easily degraded due to the oxidizing action by the ozone to form a new type of sludge different from what it was before the contact with the ozone. When the thus converted sludge is supplied to the digesting tank, the bacteria in the tank eat it. Namely, the suspended solids converted to matter of a lower molecular weight due to the oxidation by ozone can easily be digested to reduce the amount of the SS.

However, if only the aeration is applied to the sludge, there is no change in compositon of the sludge and the formation of nutrients cannot be expected. Rather bacterial activity would decrease. The digestion, therefore, must be carried out under conditions of endogenous respiration.

effect and a stronger ability to decompose organic matters than the sludge treated only by aeration and not treated with ozone.

TABLE 4

| Time (hr) | SS addition (g) | MLSS (g) | pH | ORP (mV) | Respiration (ppm/min) | Total addition of SS (g) | SS reduction (g) Section | SS reduction (g) Total | SS reduction (g) MLSS (g) · day | Remarks |
|---|---|---|---|---|---|---|---|---|---|---|
| 0 | — | 2.529 | 7.4 | 111 | 0.17 | — | — | — | — | SV 51%, TOC 860.4 ppm IC 5.0 ppm |
| 20.5 | 0.29 | 2.655 | 6.8 | 129 | 0.20 | 0.29 | 0.164 | 0.164 | 0.0648 | |
| 48.5 | 0.29 | 2.710 | — | 119 | 0.21 | 0.58 | 0.235 | 0.399 | 0.0867 | |
| 72.5 | 0.29 | 2.628 | — | 142 | 0.20 | 0.87 | 0.372 | 0.771 | 0.1416 | |
| 96.5 | 0.29 | 2.682 | — | 123 | 0.23 | 1.16 | 0.236 | 1.007 | 0.088 | |
| 144.5 | 0.29 | 2.664 | — | 159 | 0.21 | 1.45 | 0.308 | 1.315 | 0.1156 | |
| 168.5 | 0.29 | 2.646 | — | 133 | 0.21 | 1.74 | 0.308 | 1.623 | 0.1164 | |
| 175.0 | 0.29 | 2.673 | — | 128 | 0.25 | 2.03 | 0.263 | 1.886 | 0.0984 | SV 41%, TOC 973.4 ppm IC 9.1 ppm |

Note:
Sample charge: 50 cc/day (SS addition 5800 ppm × 50 cc/day = 0.29 g/day)
Volume of the digesting tank: 900 cc

EXPERIMENT 2

In this experiment, Experiment 1 was repeated except for the amount of the addition of SS.

The test results are shown in Table 4. After continous operation for 175 hours, 92.7% of the suspended solids was removed.

Comparing the values of O.R.P. (oxidation-reduction potential) in Tables 3 and 4, it is noted that the sludge having been oxidized with ozone can show in every case a higher value of the O.R.P. In general, the higher the oxidation-reduction potential at positive, the stronger the oxidizing effect. Therefore, it is confirmed that sludge oxidized with ozone has a stronger oxidative

EXPERIMENTS 3-5

In these experiments, Experiment 1 was repeated except that as a conversion means ultrasonic vibration, a homogenizer and a pressurizing apparatus were used, respectively, in place of the decomposition by ozone.

The test results are summarized in Tables 5, 6 and 7. These experiments were conducted with apparatuses similar to those shown in FIGS. 3-5. The frequency of the ultrasonic vibrations was 30 KHz, the speed of the homogenizer was 4,000 rpm and the pressure applied by the pressurizing apparatus was 120 Kg/cm$^2$.

TABLE 5

| | | | | | | | | | | |
|---|---|---|---|---|---|---|---|---|---|---|
| Ultrasonic Vibration - Aerobic Digestion | | | | | | | | | | |
| Time (hr) | SS addition (g) | MLSS (g) | pH | Respiration (ppm/min) | Total addition of SS (g) | SS reduction (g) Section | SS reduction (g) Total | SS reduction (g) MLSS (g) · day | Remarks | |
| 0 | — | 2.793 | 7.2 | 0.15 | — | — | — | — | | |
| 24.0 | 1.16 | 2.966 | — | 0.19 | 1.16 | 0.987 | 0.987 | 0.353 | | |
| 48.0 | 1.16 | 3.104 | — | 0.21 | 2.32 | 1.022 | 2.009 | 0.345 | | |
| 72.0 | 1.16 | 3.001 | — | 0.22 | 3.48 | 1.263 | 3.272 | 0.409 | | |
| 97.0 | 1.16 | 3.007 | — | 0.24 | 4.64 | 1.154 | 4.426 | 0.385 | | |
| 120.0 | 1.16 | 3.055 | — | 0.20 | 5.80 | 1.112 | 5.538 | 0.370 | | |
| 168.0 | 1.16 | 2.995 | — | 0.20 | 6.96 | 1.220 | 6.758 | 0.399 | | |
| 192.0 | 1.16 | 3.278 | — | 0.22 | 8.12 | 0.877 | 7.635 | 0.293 | | |

Note:
Sample charge: 200 cc/day (SS addition 5800 ppm × 200 cc/day = 1.16 g/day)
Volume of the digesting tank: 900 cc
A removal of SS was 94.0% after a continuous operation for 192 hours.

TABLE 6

| | | | | | | | | | |
|---|---|---|---|---|---|---|---|---|---|
| Homogenizer - Aerobic Digestion | | | | | | | | | |
| Time (hr) | SS addition (g) | MLSS (g) | pH | Respiration (ppm/min) | Total addition of SS (g) | SS reduction (g) Section | SS reduction (g) Total | SS reduction (g) MLSS (g) · day | Remarks |
| 0 | — | 2.852 | 7.2 | 0.15 | — | — | — | — | |
| 24.0 | 1.125 | 3.081 | — | 0.20 | 1.125 | 0.896 | 0.896 | 0.314 | |
| 48.0 | 1.125 | 3.161 | — | 0.21 | 2.25 | 1.045 | 1.941 | 0.339 | |
| 72.0 | 1.125 | 3.151 | — | 0.23 | 3.375 | 1.135 | 3.076 | 0.359 | |
| 96.0 | 1.125 | 3.015 | — | 0.23 | 4.50 | 1.261 | 4.337 | 0.400 | |
| 120.0 | 1.125 | 3.108 | — | 0.21 | 5.625 | 1.032 | 5.369 | 0.342 | |
| 168.0 | 1.125 | 3.226 | — | 0.21 | 6.75 | 1.007 | 6.376 | 0.324 | |
| 192.0 | 1.125 | 3.398 | — | 0.20 | 7.875 | 0.953 | 7.329 | 0.295 | |

Note:
Sample charge: 150 cc/day (SS addition 5800 ppm × 150 cc/day = 1.125 g/day)
Volume of the digesting tank: 900 cc
A removal of SS was 93.1% after a continuous operation for 192 hours.

TABLE 7

| | | | | | Total | | | | |
|---|---|---|---|---|---|---|---|---|---|
| | High Pressure Disintegration - Aerobic Digestion | | | | | | | | |
| Time | SS addition | MLSS | | Respiration | addition | SS reduction (g) | | SS reduction (g) | |
| (hr) | (g) | (g) | pH | (ppm/min) | of SS (g) | Section | Total | MLSS (g) · day | Remarks |
| 0 | — | 2.665 | 7.2 | 0.18 | — | — | — | — | |
| 24.0 | 1.125 | 2.787 | — | 0.23 | 1.125 | 1.003 | 1.003 | 0.376 | |
| 48.0 | 1.125 | 2.933 | — | 0.21 | 2.25 | 0.979 | 1.982 | 0.351 | |
| 72.5 | 1.125 | 2.817 | — | 0.21 | 3.375 | 1.241 | 3.223 | 0.423 | |
| 96.0 | 1.125 | 2.876 | — | 0.22 | 4.50 | 1.066 | 4.289 | 0.378 | |
| 144.0 | 1.125 | 2.888 | — | 0.23 | 5.625 | 1.113 | 5.402 | 0.387 | |
| 168.0 | 1.125 | 3.015 | — | 0.20 | 6.75 | 0.998 | 6.400 | 0.346 | |
| 192.0 | 1.125 | 3.034 | — | 0.22 | 7.875 | 1.106 | 7.506 | 0.367 | |

Note:
Sample charge: 150 cc/day (SS addition 5800 ppm × 150 cc/day = 1.125 g/day)
Volume of the digesting tank: 900 cc
A removal of SS was 95.3% after a continuous operation for 192 hours.

What is claimed is:

1. A method of treating all excess activated sludge discharged from an activated sludge treatment process, comprising:
    passing all of said excess sludge obtained from said process, none of which is to be returned to said activated sludge treating process, to a conversion unit;
    converting therein the cells of microorganisms in the suspended solids in said excess sludge to an organic liquid by ozonization of the excess sludge;
    passing the resulting organic liquid to a digesting stage in which activated sludge utilizes the organic liquid as a nutrient;
    aerobically digesting the organic liquid; and
    discharging the effluent from the digesting stage.

2. A method of treating all excess activated sludge discharged from an activated sludge treatment process, comprising:
    passing all of said excess sludge obtained from said process, none of which is to be returned to said activated sludge treating process, to a conversion unit;
    converting therein the cells of microorganisms in the suspended solids in said excess sludge to an organic liquid by ozonization of the excess sludge;
    passing the resulting organic liquid to a digesting stage in which activated sludge utilizes the organic liquid as a nutrient;
    aerobically digesting the organic liquid such that up to in excess of 95% of the solids suspended in said excess activated sludge can be digested; and
    discharging the effluent from the digesting stage.

* * * * *